United States Patent [19]

Ray

[11] 4,058,407

[45] Nov. 15, 1977

[54] HYDRAULIC CEMENT MIXES AND PROCESS FOR IMPROVING HYDRAULIC CEMENT MIXES

[75] Inventor: James A. Ray, Mantua, Ohio

[73] Assignee: Martin Marietta Corporation, Bethesda, Md.

[21] Appl. No.: 746,255

[22] Filed: Dec. 1, 1976

[51] Int. Cl.$^2$ .............................................. C04B 7/352
[52] U.S. Cl. ...................... 106/92; 106/314
[58] Field of Search ................ 106/91, 92, 314, 315

[56] References Cited

U.S. PATENT DOCUMENTS

| 1,544,196 | 6/1925 | Teitsworth | 106/92 |
|---|---|---|---|
| 2,006,426 | 7/1935 | Weiler | 106/92 |
| 2,876,841 | 3/1959 | Ryan | 106/92 |

Primary Examiner—J. Poer

Attorney, Agent, or Firm—Gay Chin; George W. Moxon, II

[57] ABSTRACT

A hydraulic cement mix including hydraulic cement, such as Portland type or high alumina cement, aggregate, sufficient water to effect hydraulic setting of the cement, and an additive comprising the fruit of the carob tree, *Ceratonia siliqua,* wherein the additive is present in an amount sufficient to increase the compressive strength of the mix when hardened. The additive may take many forms, but is preferably selected from the group comprising raw or roasted, carob pods or beans, extracts of the pods or beans, or combinations thereof and is present in an amount of up to about 0.25% based upon the weight of the cement, preferably between about 0.1% by weight and 0.1% by weight based upon the weight of the cement, with between 0.01% by weight and 0.05% by weight based upon the weight of the cement being an additional preferred range.

23 Claims, No Drawings

HYDRAULIC CEMENT MIXES AND PROCESS FOR IMPROVING HYDRAULIC CEMENT MIXES

BACKGROUND OF THE INVENTION

This invention relates to additive compositions, also known as admixtures, for incorporation in hydraulic cement mixes, for example, hydraulic cement concretes, mortars, grouts, neat cement mixes, nonplastic cement or concrete mixes, such as concrete block mixes, and dry mixes for making such concretes, mortars, and grouts.

Admixtures are employed to achieve, among other things, water reduction, improved compressive strength, and retardation of the rate of hardening and setting of cement mixes. Frequently, greater compressive strengths are obtained when reduced quantities of water are utilized in hydraulic cement mixes, and so often water reduction and increased compressive strength are achieved together. As retarders, such admixtures slow the chemical process of hydration so that the concrete remains plastic and workable for a longer time than concrete without such a retarder. Among the materials commonly used for water reduction and improved compressive strength, which also act as set retarders, are the lignosulfonates, such as calcium lignosulfonate; salts of hydroxycarboxylic acids; sugars such as glucose (dextrose), maltose, sucrose, fructose, and the like; and highly polymerized polysaccharides, such as dextrins.

Admixtures having set retarding properties are useful as set retarders per se, for example, to delay the set of the cement during difficult placements that require the concrete to be in a plastic condition for a longer than normal period of time or to overcome undesired acceleration of set during hot weather. If the set retarders also achieve improved compressive strength then the improved compressive strength is a supplemental benefit.

Also, additives or admixtures are frequently used in combinations to achieve certain results or overcome inefficiencies, such as where an admixture does not produce a sufficient or significant improvement in the compressive strength or does not effect the desired or a significant degree of retardation while producing other necessary and/or desirable effects. To overcome or assist or amplify these undesirable or insufficient effects, such as for example, an excessive amount of retardation, well known accelerators, such as calcium chloride and triethanolamine, that increase the rate of hydration for early strength development are frequently used. Thus, admixtures which can be used in combination with other admixtures are also desirable.

It is known in the art that some, although not all, plant derived products and carbohydrates will beneficiate concrete or mortar when employed as small percentage additions to the plastic mixes. Some of these, such as molasses, derived from sugar cane or sugar beets, also fall into the category of simple sugars. For example, U.S. Pat. No. 2,311,290 discloses the use of blackstrap molasses in an amount in the range of 0.01% to 0.1% based upon the weight of the concrete. U.S. Pat. No. 3,432,316 also discloses a useful admixture for cement and concrete mixes, which is based upon the use of plant derived products, namely a portion of the tobacco plant, such as aqueous extracts and comminuted cured tobacco plant. This discovery resulted in an admixture which produces a beneficial increase in the compressive strength of the hardened cement mix.

Further materials known to the art for improving the strength of concrete and mortar are the highly polymerized polysaccharides, such as the dextrins. The polysaccharides are less severe retarders of cement hydration than the simple sugars, and they can be used without danger of complete or severe inhibition of hydration and hardening.

U.S. Pat. No. 3,432,317 discloses the use of saccharide polymers, composed of glucose units having a size range of from three to on the order of twenty-five glucose units, as additives for cement mixes. The glucosaccharides are disclosed as being more advantageous than more highly polymerized polysaccharides and more highly depolymerized products. While such an admixture as U.S. Pat. No. 3,432,317 may perform adequately as a means for increasing compressive strength in cements, concretes and mortars, the potential unavailability of materials for producing such admixtures makes alternative admixtures, which produce corresponding desired effects, desirable and necessary.

The problem of unavailability would apply to other known additives and admixtures. Increasing demands can make admixtures unavailable. Lignosulfonates, for example, are not as ubiquitously available as they once were due to the pressures of, among others, environmental restrictions which have forced suppliers to find means of consuming these materials through their own corporate channels. Also, sugars and dextrins are subject to the whims and fancies of speculative interests, and so have become quite costly, as well as occasionally being unavailable.

Further, the increasing cost and unavailability of energy has made it desirable to find, in addition to alternative additives and/or admixtures per se, additives and admixtures which require only a minimum or reduced amount of energy to produce.

Thus, a need exists for new, alternative additive or admixture compositions for incorporation in hydraulic cement mixes, which additives will provide improved compressive strength for or control of the rate of hardening of the resulting cement products, while not causing adverse effects in the hydraulic mixes.

SUMMARY OF THE INVENTION

The present invention involves an additive composition or admixture for incorporation in hydraulic cement mixes, such as concretes, mortars, and grouts, neat cement mixes, nonplastic cement mixes, and dry mixes for making concretes, mortars, and grouts, and thus the improved cement mixes and process for incorporating the additive composition.

For the purposes of this invention, the term "hydraulic cement" is intended to mean and to include all cementitious compositions capable of being set and hardened by the action of water, such as Portland cements, sulphate-resisting cements, blast-furnace cements, pozzolanic cements, and high alumina cements, since the additive composition or admixture of the present invention can be incorporated into all hydraulic cement mixes. But the preferred use of the present additive composition or admixture is in Portland type cement mixes. Also for the purposes of this invention, the term "Portland type cement" is intended to include all cementitious compositions which have a high content of tricalcium silicate and thus are Portland cement or are chemically similar or analogous to Portland cement, the specification for which is set forth in ASTM C 150-74. This would include cements in which fly ash, such as from steam or power generating stations, pozzolana slag, such as from blast furnaces, or mixtures of these, are incorporated in and which result in a Portland type cement.

Broadly, the invention comprises the use of the fruit of the carob tree, Ceratonia Siliqua, as an additive or admixture in cement mixes, the additive being present in an amount sufficient to increase the strength of the mix when hardened. The additive is preferably selected from the group comprising raw or roasted, carob pods or beans, extracts of the pods or beans; or combinations thereof, and is present in an amount of up to about 0.25% by weight based upon the weight of the cement, preferably between about 0.01% and about 0.1% by weight based upon the weight of the cement mix, although an amount in the range of between about 0.01% and about 0.05% by weight is also preferred.

Use of the additive is beneficial to the engineering properties of hydraulic cement mixes in that it results in products of improved compressive strength over similar mixes prepared without the additive. Further, use of this additive within the 0.01% to 0.1% range does not cause adverse effects on the setting times of the hydraulic mixes, and, in fact, results in a slight retardation of the setting time. Still further, the additive is useful within the disclosed addition range, as a retarder per se since it can achieve a high degree of retardation while still producing a gain in the compressive strength of the hardened mix.

It is therefore an object of the present invention to provide an improved hydraulic cement mix.

It is another object of the present invention to provide a hydraulic cement mix, such as a Portland type or high alumina cement mix, wherein an additive composition or admixture is included which increases the compressive strength of the mix when hardened.

It is yet another object of the present invention to provide a hydraulic cement mix, such as a Portland type or high alumina cement mix, wherein an additive composition or admixture is included which beneficially retards the rate of hardening of the cement mix.

It is a further object of the present invention to provide a process for increasing the strength of cement mixes without adversely affecting the setting times.

It is yet a further object of the present invention to provide a process for increasing the compressive strength of hardened hydraulic cement mixes, such as Portland type cement mixes, while beneficially retarding the rate of setting and hardening of the cement mix.

These and other objects and advantages of the invention will become apparent upon consideration of the description and discussion which follow.

DETAILED DESCRIPTION OF THE INVENTION

The carob or locust tree, Ceratonia Siliqua, is commercially grown in tropical America, Africa and the Mediterranean. The fruit of the carob tree is a long, flat pod, approximately 6" to 12" long and 1" across, which contains many seeds surrounded by a sweet, fleshy pulp that is edible. The fruit and/or the seeds or beans are variously known as carob, carob bean, carob-tree bean, St. John's bread, algarroba, algarroba bean, and locust bean. Extracts from the beans have a known utility as emulsifying agents.

The term "carob" should not be confused with caroba or carob wood, which is produced from the tree Jacaranda Copaia, and the product is also known as Jacaranda. Further, the term "locust" should not be confused with the locust tree, Robinia Pseudoacacia, of North America, or with the honey locust tree, Gleditsia Triacanthus, also of North America. Still further, the term "algarroba" should not be confused with the algarroba tree, Prosopis Chilensis.

Carob fruit is commercially available in many forms, including whole, raw, dried pods from which the seeds or beans have been removed, whole, roasted, bean-free pods, raw or roasted beans, combinations of beans and pods, or comminuted forms, such as kibbled (which means broken into short fragments) pods, which are generally about $\frac{1}{4}$" thick by $\frac{1}{4}$" to $\frac{3}{4}$" long by $\frac{1}{4}$" to $\frac{3}{4}$" wide, or carob flour, which is finely ground carob powder made from the pods of dried or roasted carob fruit. There is no criticality in the kind or form or portion of the carob fruit employed. Therefore, raw or roasted carob fruit, with or without seeds, or combinations thereof, can be used.

The raw pods are pods, with or without seeds or beans, which have been air-dried, but are otherwise untreated. Analysis of a random, raw, dried pod, which could be considered as a typical pod, indicates that the moisture content is in the range of 14 to 16% by weight. There is a notable lack of consistency in the use of the terms "roast" or "roasted," but they generally refer to a process where the raw pods, with or without beans, are subjected to sufficient heat for a sufficient period of time to acquire certain characteristics desired for the usual market. The roasting step is not essential to the present invention, but roasted carob pods are a present commercially available form, and thus a source, of carob fruit. The precise roasting conditions will vary depending upon the particular differences in the individual pieces of fruit and the desired quality of the plant material, i.e., the fruit, for the normal commercial use for which it was initially intended.

In the practice of the present invention, the fruit of the carob tree, Ceratonia Siliqua, is incorporated in hydraulic cement mixes, such as Portland type cement concretes and mortars, high alumina cement concretes, mortars, and grouts, neat cement mixes, nonplastic cement mixes, and dry mixes for making such concretes, mortars, and grouts in amounts sufficient to increase the compressive strength of the hardened mix upon setting thereof. Broadly, the additive composition or admixture will be incorporated in the cement mix in an amount of up to about 0.25% by weight based upon the weight of the cement, preferably within the range of from 0.01% by weight to 0.1% by weight based upon the weight of the cement mix. In an additional preferred range, the amount will be in an amount within the range of from 0.01% by weight to 0.05% by weight based upon the weight of the cement mix.

The fruit of the carob tree, Ceratonia Siliqua, employed in the cement mixes of the present invention, can comprise the fruit itself or an extract of the fruit or combinations thereof. In either event, the principal effect of the addition to cement mixes is the increase in the compressive strength of the hardening mix. Additionally, the additive compositions, or admixtures, in accordance with the present invention would be useful as retarders per se since they retard the rate of hardening of the cement mixes without adversely affecting the compressive strengths of the hardened mix.

The extracts of the fruit of the carob tree, Ceratonia Siliqua, comprise those parts of the fruit which are soluble in the particular solvent involved. Normally and for convenience, the solvent will be an aqueous system, including alkaline, neutral, and acidic, aqueous systems such as will produce in hydraulic cement mixes, such as Portland type cement mortars or concretes or grouts, the desirable effects mentioned above, although other solvents, such as alcohol or the like, could be employed. While it is clear that the chemical composition of the extracts will vary in detail with varying conditions of extraction, these chemicals are so complex as to defy a completely definitive analysis. Consequently, the material of the present invention is best defined in terms of the effects it will produce in concrete and mortar.

Extracts of the carob fruit may be made by stirring together the carob fruit with a solvent, such as water or a solution (usually aqueous) of an acid or alkali or other solvent material, and then filtering or otherwise removing from the resulting mixture, the insoluble portions of the carob fruit. The carob fruit to be extracted is preferably ground so as to increase its surface area and make the extraction more efficient, but similar extracts having similar properties can be obtained if the carob fruit is not ground at all. Similarly, grinding of the plant material is rendered more efficient if it is previously dried, but prior drying of the plant material is only desirable and not necessary to the present invention. Since dried, raw carob fruit is commercially available, this would be a convenient starting material for making the extracts. Under the mildest conditions of extraction, portions of the carob fruit may simply be combined with water at room or ambient temperature in an open vessel. Stirring or other forms of agitation can be employed to increase the intimacy of contact between the solvent and the carob fruit for extraction purposes. At conditions of intermediate severity of extraction, such as where the carob fruit and solvent, such as water or an aqueous solution, are heated at the boiling point of the latter, a convenient means is a vessel equipped with a reflux condenser, so that the extraction may be conducted without loss of the liquid phase. More severe conditions of extraction, which employ temperatures ranging upward to 180° C or higher may require the use of a closed-system reactor, e.g., a pressure cooker, preferably with provision for continuous stirring and instrumentation to monitor pressure and temperature. If a solvent other than neutral water is used in the extraction, the desired solvent solution may be attained by prior addition of common and economical acids, such as sulfamic, sulfuric, hydrochloric, or nitric, or a common and economical alkali, such as sodium hydroxide. Any of a wide range of concentrations of these agents may be used, such as for example a 1% by weight solution. Any of a variety of initial ratios of carob fruit to aqueous phase may be used but a weight ratio of from 5 to 35 percent of plant to liquid gives products having greatest ease of filtering if an extract is desired, or of incorporation into a concrete mix if it is desired to use the whole product without filtering.

Whether the filtrate or the total product is to be used in concrete, the concentration of soluble matter in the liquid will depend on the concentration of the initial slurry and the temperature of extraction. Typically, for a 10 percent initial slurry of the plant material on a dry solids basis, about 50 to 90 percent by weight solubles would result in the liquid phase. When the filtered extract is to be used, it is convenient to add this solution as part of the normal mix water required by the concrete, so that no previous evaporation or concentration is required. However, if the extracts are concentrated to any desired degree prior to introduction into a concrete mix, the same effects are secured by all dosages which are equivalent with respect to weight of solute, regardless of volume or concentration of the extract.

When the solid carob fruit per se is employed, it can be incorporated into hydraulic cement mixes preferably by adding it to a portion of the mix water used for mixing of the hydraulic cement and aggregate. But, the additive could be included as part of a dry cement mix or added in any other convenient manner.

The term aggregate is intended to include both fine aggregate, such as sand, and coarse aggregate, such as crushed stone or gravel, as is common in the art. In general for mortars, the aggregate may be sand or other fine aggregate meeting the requirements of ASTM standard C-33. In general for concretes, the aggregate may be sand or other fine aggregate plus crushed stone, gravel, or other coarse aggregate in accordance with ASTM standard C-33. The precise size, purity, quality, and quantity, or ranges thereof, of the fine and coarse aggregates will vary depending upon the desired use and properties of the mortar or concrete. For most common uses, although not limited thereto, the size of the fine aggregate will be within the broad range of about +4 mesh to −100 mesh, while the size of the coarse aggregate will be within the broad range of 3 inches to 4 mesh. The coarse aggregate will usually be of mineral origin, such as gravel or crushed rock, but it may in some cases consist at least partially of graded metallic material such as iron chips, slag, or other manufactured aggregate.

Further in general for dry mortar mixes, the proportion of fine aggregate to cement will be in the range of about 25% to about 75% by weight based upon the weight of the cement mix, depending upon the nature of the aggregate and the desired properties of the mix. For dry concrete mixes, the fine and coarse aggregates will fall generally within the broad range of 20% to 80% by weight of the mix and 5 to 60% by weight of the mix, respectively, depending upon the desired properties and use of the mix.

For both the mortars and cements, the amount of water employed generally should be enough to effect hydraulic setting of the cement present in the mix and to provide suitable workability. This may broadly range from about 20% to 60% by weight of the cement in the mix for the mortars and about 25% to 70% by weight of the cement in the mix for the concretes. The precise amounts of water will depend upon the end use of the cement mix, as well as the aggregate present in the mix.

For purposes of illustrating the advantageous results obtainable by the practice of the present invention, plain cement mixes, more particularly concrete mixes, were prepared and compared with such mixes in which the fruit of the carob tree, Ceratonia Siliqua, has been incorporated in varying kinds or forms and dosages. The same type and brand of cement was used in each mix, and the proportion and kind of aggregate employed were substantially the same. A sufficient amount of water was added to each mix to effect hydraulic setting of the cement mix and to produce cement mixes of essentially the same consistency. In addition and for the purpose of further illustrating the invention, comparisons were made with a glucosaccharide, such as would be representative of U.S. Pat. No. 3,432,317, since saccharides are known strength enhancing additives.

The results shown in Table II illustrate the use of other forms and kinds of carob fruit, as well as the upper Table I

| Mix No. | Additive | Percent by weight of cement | Water:lbs./ cu. yd. of cement product | Air;vol. percent of cement product | Rate of hardening relative to plain mix;[1] hours | Compressive strength of cement product: p.s.i. | |
|---|---|---|---|---|---|---|---|
| | | | | | | 7 days | 28 days |
| Cement No. 1 | | | | | | | |
| 1 | None | | 301 | 1.6 | 0 | 3220 | 4685 |
| 2 | Carob Flour | 0.01 | 299 | 1.7 | 0 | 3350 | 4870 |
| 3 | " | 0.025 | 299 | 1.5 | 0 | 3500 | 4845 |
| 4 | " | 0.05 | 298 | 1.6 | +½ | 3500 | 5015 |
| 5 | " | 0.10 | 297 | 1.7 | +1½ | 3715 | 5225 |
| 6 | Glucosaccharide | 0.065 | 294 | 1.7 | +½ | 3705 | 5145 |
| Cement No. 2 | | | | | | | |
| 7 | None | | 289 | 1.9 | 0 | 3375 | 4335 |
| 8 | Carob Flour | 0.01 | 282 | 1.9 | 0 | 3495 | 4520 |
| 9 | " | 0.025 | 281 | 2.1 | 0 | 3645 | 4665 |
| 10 | " | 0.05 | 280 | 2.3 | +½ | 3805 | 4870 |
| 11 | " | 0.10 | 280 | 2.3 | +1½ | 3910 | 4940 |
| 12 | Glucosaccharide | 0.065 | 283 | 2.1 | +½ | 3855 | 4905 |

[1]Acceleration of set is indicated by a minus (−) sign, while retardation of set is indicated by a plus (+) sign.

ripe fruit pods of Ceratonia Siliqua (St. John's bread). The amount of cement in the mix was nominally 5 U.S. sacks per cubic yard of concrete (a U.S. sack of cement weighs 94 pounds), the fine aggregate to coarse aggregate ratio employed with 0.49, and the consistencies of the concretes were such that they had slumps in the range of 3¼ to 3¾ inches. As can be seen, the use of carob flour resulted in increased compressive strengths over similar mixes without the additive. At the higher doses, the addition of carob flour resulted in a slight retardation of the setting times for the cement mixes involved. In comparison to the use of glucosaccharide additive, the carob flour admixture produced comparable or higher compressive strength gains and comparable retardation with respect to the setting times in comparison to plain concrete.

limits of the range of the usable dosage, in Type I Portland cement concrete mixes. The amount of cement in the mix was nominally 5 U.S. sacks per cubic yard of concrete, the fine aggregate to coarse aggregate ratio employed was 0.48, and the consistencies of the concretes were such that they had slumps in the range of 3¼ inches to 4 inches. In all the mixes in Table II, the starting material was either "raw carob," i.e., kibbled, raw, dried carob pods, the fragments having dimensions of about ⅛" to ¼" thickness by ¾" wide by ¾" long, having an average moisture content of 15.1% by weight, being essentially bean free, and being commercially available, or "roasted or roast carob," i.e., kibbled, roasted carob pods, the fragments having dimensions of about ¼" thickness by ½" long by ¼" wide, having an average moisture content of 11.5%, being essentially bean free, and also being commercially available.

Table II

| Mix No. | Additive | Percent by weight of cement | Water:lbs./ cu. yd. of cement product | Air; vol. percent of cement product | Rate of hardening relative to plain mix;[1] hours | Compressive strength of cement product: p.s.i. | |
|---|---|---|---|---|---|---|---|
| | | | | | | 7 days | 28 days |
| Cement No. 1 | | | | | | | |
| 13 | None | | 321 | 1.7 | 0 | 2800 | 4490 |
| 14 | Roasted Carob Pods | 0.01 | 316 | 2.0 | +½ | 3000 | 4680 |
| 15 | " | 0.025 | 316 | 1.9 | +½ | 3000 | 4790 |
| 16 | " | 0.05 | 315 | 2.2 | +1½ | 3140 | 4880 |
| 17 | " | 0.1 | 313 | 2.3 | +2½ | 3220 | 5075 |
| 18 | " | 0.25 | 304 | 2.7 | excessive[2] | 3285 | 5135 |
| 19 | " | 0.50 | 291 | 3.2 | excessive[3] | — | — |
| 20 | " | 1.0 | 278 | 4.4 | excessive[3] | — | — |
| 21 | " | 2.0 | 252 | 7.5 | excessive[3] | — | — |
| 22 | Glucosaccharide | 0.05 | 314 | 2.1 | +½ | 3050 | 4765 |
| Cement No. 2 | | | | | | | |
| 23 | None | | 322 | 1.9 | 0 | 2900 | 4235 |
| 24 | Roasted Carob Pods | 0.01 | 320 | 2.0 | 0 | 2920 | 4375 |
| 25 | " | 0.025 | 320 | 2.0 | +½ | 2990 | 4300 |
| 26 | " | 0.05 | 317 | 2.2 | +½ | 3185 | 4600 |
| 27 | " | 0.1 | 313 | 2.3 | +1½ | 3340 | 4760 |
| 28 | " | 0.25 | 307 | 2.6 | excessive[2] | 3360 | 4915 |
| 29 | " | 0.50 | 294 | 3.4 | excessive[3] | — | — |
| 30 | " | 1.0 | 273 | 4.2 | excessive[3] | — | — |
| 31 | " | 2.0 | 246 | 7.6 | excessive[3] | — | — |
| 32 | Glucosaccharide | 0.05 | 319 | 2.1 | +½ | 3040 | 4405 |
| Cement No. 1 | | | | | | | |
| 33 | None | | 322 | 1.8 | 0 | 3055 | 4730 |
| 34 | Raw Carob Pods | 0.01 | 320 | 1.9 | 0 | 3035 | 4750 |
| 35 | " | 0.025 | 316 | 2.0 | +½ | 3290 | 5145 |
| 36 | " | 0.05 | 311 | 2.2 | +1 | 3350 | 5260 |
| 37 | " | 0.1 | 308 | 2.3 | +3 | 3330 | 5220 |
| 38 | " | 0.25 | 303 | 2.5 | excessive[2] | 3300 | 5340 |
| 39 | " | 0.5 | 293 | 3.1 | excessive[3] | — | — |
| 40 | " | 1.0 | 278 | 4.6 | excessive[3] | — | — |
| 41 | " | 2.0 | 251 | 7.5 | excessive[3] | — | — |
| 42 | Glucosaccharide | 0.05 | 318 | 1.9 | +½ | 3210 | 5045 |
| Cement No. 2 | | | | | | | |
| 43 | None | | 322 | 1.9 | 0 | 2810 | 4350 |
| 44 | Raw Carob Pods | 0.01 | 321 | 2.0 | 0 | 2900 | 4380 |

Table II-continued

| Mix No. | Additive | Percent by weight of cement | Water:lbs./ cu. yd. of cement product | Air; vol. percent of cement product | Rate of hardening relative to plain mix;[1] hours | Compressive strength of cement product: p.s.i. 7 days | 28 days |
|---|---|---|---|---|---|---|---|
| 45 | " | 0.025 | 318 | 2.1 | 0 | 2865 | 4340 |
| 46 | " | 0.05 | 315 | 2.3 | +¼ | 3075 | 4485 |
| 47 | " | 0.1 | 311 | 2.5 | +1¼ | 3265 | 4790 |
| 48 | " | 0.25 | 306 | 2.8 | excessive[2] | 3220 | 4940 |
| 49 | " | 0.5 | 294 | 3.1 | excessive[3] | — | — |
| 50 | " | 1.0 | 279 | 4.1 | excessive[3] | — | — |
| 51 | " | 2.0 | 251 | 7.5 | excessive[3] | — | — |
| 52 | Glucosaccharide | 0.05 | 319 | 2.0 | +¼ | 3030 | 4515 |
| Cement No. 1 | | | | | | | |
| 53 | None | | 321 | 2.0 | 0 | 2825 | 4615 |
| 54 | Water Extract of Roast Carob[4] | 0.1 | 319 | 2.1 | +¼ | 2825 | 4685 |
| 55 | " | 0.025 | 316 | 2.2 | +¾ | 2955 | 4880 |
| 56 | " | 0.05 | 315 | 2.3 | +2 | 3020 | 5055 |
| 57 | " | 0.1 | 309 | 2.4 | excessive[2] | 3180 | 5170 |
| 58 | Water Extract of Raw Carob[4] | 0.01 | 319 | 2.1 | +¼ | 2830 | 4730 |
| 59 | " | 0.025 | 317 | 2.2 | +¾ | 2995 | 4880 |
| 60 | " | 0.05 | 315 | 2.3 | +2 | 2995 | 4925 |
| 61 | " | 0.1 | 311 | 2.3 | excessive[2] | 3130 | 5110 |
| 62 | Glucosaccharide | 0.05 | 316 | 2.4 | +¼ | 2945 | 4790 |
| Cement No. 2 | | | | | | | |
| 63 | None | | 319 | 1.9 | 0 | 2815 | 4320 |
| 64 | Water Extract of Roast Carob[4] | 0.01 | 316 | 1.9 | +¼ | 2985 | 4270 |
| 65 | " | 0.025 | 316 | 2.0 | +¼ | 2950 | 4425 |
| 66 | " | 0.05 | 313 | 2.1 | +1¼ | 3115 | 4590 |
| 67 | " | 0.1 | 309 | 2.2 | +4 | 3310 | 4875 |
| 68 | Water Extract of Raw Carob[4] | 0.01 | 315 | 2.1 | +¼ | 3020 | 4445 |
| 69 | " | 0.025 | 315 | 2.0 | +¼ | 2945 | 4455 |
| 70 | " | 0.05 | 313 | 2.1 | +1¼ | 3105 | 4610 |
| 71 | " | 0.1 | 312 | 2.2 | +3¼ | 3235 | 4750 |
| 72 | Glucosaccharide | 0.05 | 315 | 1.9 | +¼ | 3035 | 4545 |
| Cement No. 1 | | | | | | | |
| 73 | None | | 323 | 1.7 | 0 | 2930 | 4690 |
| 74 | Water Extract of Roast Carob[5] | 0.01 | 321 | 1.8 | +¼ | 2930 | 4680 |
| 75 | " | 0.025 | 318 | 1.9 | +¾ | 3070 | 4710 |
| 76 | " | 0.05 | 317 | 2.0 | +1¼ | 3220 | 4905 |
| 77 | Water Extract of Roast Carob[5] | 0.1 | 314 | 2.2 | 6 3¼ | 3160 | 5170 |
| 78 | Water Extract of Raw Carob[5] | 0.01 | 319 | 1.9 | +1¼ | 2980 | 4760 |
| 79 | " | 0.025 | 318 | 1.9 | +¾ | 3115 | 4825 |
| 80 | " | 0.05 | 316 | 1.9 | +1¾ | 3195 | 4885 |
| 81 | " | 0.1 | 315 | 2.1 | +3¼ | 3245 | 5105 |
| 82 | Glucosaccharide | 0.05 | 1¼1.8 | +¼ | 3235 | | 5065 |
| Cement No. 2 | | | | | | | |
| 83 | None | | 308 | 1.7 | 0 | 2970 | 4335 |
| 84 | Water Extract of Roast Carob[5] | 0.01 | 302 | 1.8 | 1.9 | 3280 | 4740 |
| 85 | " | 0.025 | 301 | 1.9 | 0 | 3375 | 4720 |
| 86 | 1¼" | 0.05 | 300 | 2.0 | +311 | 3460 | 4940 |
| 87 | " | 0.1 | 292 | 2.0 | +103 | 3725 | 5160 |
| 88 | Water Extract of Raw Carob[5] | 0.01 | 301 | 2.0 | 0 | 3320 | 4680 |
| 89 | " | 0.025 | 298 | 2.0 | 0 | 3430 | 4790 |
| 90 | " | 0.05 | 294 | 2.0 | +1 | 3445 | 4865 |
| 91 | " | 0.1 | 290 | 2.0 | +2¼ | 3510 | 5140 |
| 92 | Glucosaccharide | 0.05 | 299 | 1.9 | 0 | 3470 | 4945 |
| Cement No. 1 | | | | | | | |
| 93 | None | | 316 | 1.6 | 0 | 3020 | 4450 |
| 94 | Sulfamic Acid Extract of Roast Carob[5] | 0.01 | 315 | 1.6 | +¼ | 3070 | 4590 |
| 95 | " | 0.025 | 313 | 1.7 | +¼ | 3020 | 4660 |
| 96 | " | 0.05 | 309 | 1.9 | +¼ | 3220 | 4965 |
| 97 | " | 0.1 | 307 | 2.0 | +1¼ | 3400 | 5200 |
| 98 | Sulfamic Acid Extract of Raw Carob[5] | 0.01 | 314 | 1.8 | +¼ | 3160 | 4830 |
| 99 | " | 0.025 | 312 | 1.9 | +¼ | 3120 | 4695 |
| 100 | " | 0.05 | 310 | 1.9 | +¼ | 3180 | 4840 |
| 101 | " | 0.1 | 306 | 1.9 | +1¼ | 3320 | 4950 |
| 102 | Glucosaccharide | 0.05 | 311 | 1.8 | +¼ | 3140 | 4830 |
| Cement No. 2 | | | | | | | |
| 103 | None | | 318 | 1.7 | 0 | 2940 | 4275 |
| 104 | Sulfamic Acid Extract of Roast Carob[5] | 0.1 | 317 | 1.9 | -¼ | 2980 | 4460 |
| 105 | " | 0.025 | 316 | 1.8 | +¼ | 2940 | 4425 |
| 106 | " | 0.05 | 314 | 1.9 | +¼ | 3140 | 4640 |
| 107 | " | 0.1 | 312 | 1.9 | +1 | 3220 | 4775 |
| 108 | Sulfamic Acid Extract of Raw Carob[5] | 0.01 | 317 | 1.9 | +¼ | 3115 | 4555 |
| 109 | " | 0.025 | 315 | 1.9 | 0 | 3105 | 4595 |
| 110 | " | 0.05 | 313 | 1.9 | 0 | 3145 | 4655 |
| 111 | " | 0.10 | 311 | 2.0 | +¾ | 3260 | 4750 |
| 112 | Glucosaccharide | 0.05 | 317 | 1.8 | +¼ | 3085 | 4520 |
| Cement No. 1 | | | | | | | |
| 113 | None | | 320 | 1.7 | 0 | 2855 | 4550 |
| 114 | Sodium Hydroxide Extract of Roast Carob[5] | 0.01 | 318 | 1.7 | +¼ | 2930 | 4495 |
| 115 | " | 0.025 | 317 | 1.7 | +¼ | 2970 | 4620 |
| 116 | "0.05 | 315 | 2.0 | +¾ | 3040 | 4685 | |
| 117 | " | 0.1 | 312 | 2.1 | +2¼ | 3115 | 4600 |

Table II-continued

| Mix No. | Additive | Percent by weight of cement | Water:lbs./ cu. yd. of cement product | Air; vol. percent of cement product | Rate of hardening relative to plain mix;[1] hours | Compressive strength of cement product: p.s.i. 7 days | 28 days |
|---|---|---|---|---|---|---|---|
| 118 | Sodium Hydroxide Extract of Raw Carob[5] | 0.01 | 317 | 1.8 | +1¼ | 2915 | 4560 |
| 119 | " | 0.025 | 318 | 1.9 | +¾ | 2965 | 4720 |
| 120 | " | 0.05 | 317 | 1.9 | +¾ | 3005 | 4685 |
| 121 | " | 0.1 | 314 | 1.9 | +2¼ | 3030 | 4755 |
| 122 | Glucosaccharide | 0.05 | 316 | 1.7 | +¾ | 3035 | 4685 |
| Cement No. 2 | | | | | | | |
| 123 | None | | 325 | 1.9 | 0 | 2945 | 4430 |
| 124 | Sodium Hydroxide Extract of Roast Carob[5] | 0.01 | 324 | 2.0 | 0 | 3135 | 4550 |
| 125 | " | 0.025 | 323 | 2.0 | +¾ | 3055 | 4555 |
| 126 | " | 0.05 | 323 | 2.0 | +¾ | 3145 | 4660 |
| 127 | " | 0.1 | 316 | 2.3 | +1¼ | 3280 | 4855 |
| 128 | Sodium Hydroxide Extract of Raw Carob | 0.01 | 324 | 2.0 | +¾ | 3060 | 4670 |
| 129 | " | 0.025 | 324 | 2.0 | +¾ | 3015 | 4625 |
| 130 | " | 0.05 | 323 | 2.0 | +¾ | 3125 | 4630 |
| 131 | " | 0.1 | 317 | 2.3 | +¾ | 3290 | 4835 |
| 132 | Glucosaccharide | 0.05 | 323 | 2.0 | +¾ | 3055 | 4490 |

[1]Acceleration of set is indicated by a minus (−) sign, while retardation of set is indicated by a plus (+) sign.
[2]The cylinders were still soft at end of the testing day (approximately 6 to 8 hours).
[3]The cylinders were still soft after 24 hours, and no compressive strength tests were made.
[4]Extraction was conducted at room temperature and pressure.
[5]Extraction was conducted under pressure (14 psig) and at elevated temperature (120° C).

To test both the raw carob and the roasted carob as additives, the carob, whether raw or roasted, was ground so as to pass through a U.S. No. 100 mesh sieve, i.e., the carob particles were about 0.0059 inch (0.149mm) in diameter or less, and the so formed powder was then added, without further treatment, to the concrete mixes as a water slurry using part of the mixing water for the concrete mix. The grinding step is not essential to the invention and is done for convenience to speed the mixing the dispersing of the carob into the cement mix. Thus, the carob fruit could be added as a whole unit or in any comminuted form, ranging in size from several inches across to fractions of a micron in diameter, preferably in the range of 0.1 into to 0.0001 inch in diameter.

Aqueous extracts were made by mixing 2 liters of the particular aqueous solvent (water, 1% by weight sulfamic acid, and 1% by weight sodium hydroxide are illustrated as solvents) and 200 grams (on an as received basis) of raw or roasted carob, which has been ground (for convenience) to pass a U.S. No. 8 mesh sieve. After mixing for one hour, the insoluble material or residue was removed by filtering and discarded. Water extracts were made at both room temperature and pressure, and elevated temperature and pressure, i.e., by pressure cooking the carob and solvent at 15 psig and 120° C. There is no criticality in the use of 14 psig and 120° C as the elevated temperature and pressure to be employed, and so are not limiting. The pressure cooking, for the purposes of these runs, was done in an ordinary pressure cooker pot, but other apparatus could be employed to achieve high temperature and pressure. The sulfamic acid and sodium hydroxide extracts were also made under the elevated temperature and pressure conditions. The yields for the various extractions, on a dry solids basis, are set forth in the following Table III:

Table III

| Solvent | Carob Fruit | Temperature (° C.) | Pressure (P.S.I.G.) | Yield (% by wt.) |
|---|---|---|---|---|
| Water | Raw Carob Pods | Room | Room | 50.1 |
| Water | Roast Carob Pods | Room | Room | 54.2 |
| Water | Raw Carob Pods | 120 | 14.0 | 82.2 |
| Water | Roast Carob Pods | 120 | 14.0 | 82.5 |
| Sulfamic Acid Soln. | Raw Carob Pods | 120 | 14.0 | 71.1 |
| Sulfamic Acid Soln. | Roast Carob Pods | 120 | 14.0 | 71.1 |
| Sodium Hydroxide | Raw Carob Pods | 120 | 14.0 | 81.3 |
| Sodium Hydroxide | Roast Carob Pods | 120 | 14.0 | 88.4 |

As can be seen from the results in Table II, the use of a portion of the carob fruit, either per se in comminuted form or as an extract, results in increased compressive strengths over similar mixes without the additive. Although the use of 0.25% by weight carob resulted in a high degree of retardation (in excess of approximately 6 to 8 hours longer than the concrete mixes containing no additive), nevertheless use of this amount resulted in beneficial gains in the compressive strength of the hardened cement mixes as indicated by the 7 and 28 day compressive strengths which were measured. It is noted that the increases in the amount of carob employed generally always produced corresponding increases in the compressive strength of the hardened mixes.

Some of the specific mixes produced results which seemed to be outside of the general trends, such as for example, Mix No. 104 which resulted in an acceleration of the rate of hardening, but these results are considered to be within the normal limits of experimental error. In excess of 0.25% by weight carob, the retardation was so great (more than 24 hours) that the cylinders were discarded without making compressive strength tests at 7 and 28 days. Thus, while the use of up to 0.25% by weight carob is generally preferred, the amounts in excess of 0.25% could still be useful where a large amount of retardation of the rate of hardening is desired. Further, within the preferred ranges of 0.01% to 0.1% by weight and 0.01% to 0.05% by weight based upon the weight of the cement, the compressive strength of the cement mix can be increased without appreciably increasing the amount of air entrained in the mix. Further, in comparison to the use of glucosaccharide, the use of carob fruit, Ceratonia Siliqua, produced comparable results.

The results shown in Table IV illustrate the use of the whole carob fruit, i.e., all of both the pod and the seeds, as well as combinations of carob fruit with triethanolamine, which is a well known accelerator. Further, as set forth in Table IV, comparisons were made between carob fruit and two known prior art retarders, namely a glucosaccharide, such as would be representative of U.S. Pat. No. 3,432,317, and calcium lignosulfonate.

The carob fruit additive employed was a water extract made by combining 2 liters of tap water and 200 grams (based upon an as-received solids basis) of carob fruit, which had been ground (for convenience) to pass a U.S. No. 8 mesh sieve, in a pressure cooking vessel and heating to 120° C at 14 p.s.i.g. for about one hour. After the heat was removed and pressure released, the mixture was filtered and the residue discarded. The yield was 70% on a dry solids basis. The carob fruit employed as the starting material was dry, whole, raw fruit, including pod and seeds, of the carob tree, Ceratonia Siliqua, and had a moisture content of 22.6% by weight.

Still further, no adverse effects were encountered when the carob fruit admixture was used in combination with a known accelerator (triethanolamine).

For the purpose of illustrating the utility of carob in other hydraulic cements, raw carob pod, i.e., ground (to 100 mesh ± 1 mesh) raw, kibbled carob pods, was tested in limited dosages in a commercially available high alumina cement mix. Raw carob pod was selected simply as an example of a carob and was employed in dosages of 0.025% and 0.05% by weight based upon the weight of the cement. The high alumina cement employed was "CEMENT FONDU", which typically comprises, in percentages by weight, 40% $Al_2O_3$, less than 2% $TiO_2$, 38% CaO, 11% $Fe_2O_3$, 4% FeO, and less than 5% $SiO_2$, but other high alumina cements are available, such as "LUMNITE" and "REFCON," and could have been employed. The cement mix comprised a high alumina concrete mix containing nominally about 5¼ sacks (at 94 lbs. per sack) of cement per cubic yard of concrete, the fine aggregate to coarse aggregate ratio was 0.47, and the consistencies of the concretes were such that they had slumps in the range of 3¼ to 3¾ inches. The results, which are set forth in Table V, and which, for convenience, show the compressive strengths at one and seven days only, show that carob is useful in high alumina cements to increase the compres- Table IV

| Mix No. | Additive | Percent by weight of cement | Water; lbs./ cu. yd. of cement product | Air; vol. percent of cement plain mix;[1] product | Rate of hardening relative to p.s.i. hours | Compressive strength of cement product; 7 days | 28 days |
|---|---|---|---|---|---|---|---|
| Cement No. 1 | | | | | | | |
| 133 | None | | 315 | 1.8 | 0 | 2980 | 4340 |
| 134 | Water Extract of Whole, Raw Carob | 0.01 | 310 | 1.9 | 0 | 3165 | 4560 |
| 135 | " | 0.025 | 309 | 2.1 | +¼ | 3285 | 4640 |
| 136 | " | 0.05 | 308 | 2.2 | +½ | 3240 | 4710 |
| 137 | " | 0.1 | 308 | 2.3 | +3½ | 3310 | 4775 |
| 138 | Glucosaccharide | 0.05 | 309 | 1.9 | +¼ | 3280 | 4625 |
| 139 | Calcium lignosulfonate | 0.25 | 289 | 3.7 | +½ | 3465 | 4890 |
| 140 | Triethanolamine plus Water Extract of Whole, Raw Carob | 0.050 Total (0.025 + 0.025) | 309 | 2.4 | −¼ | 3400 | 4870 |
| 141 | Triethanolamine plus Water Extract of Whole, Raw Carob | 0.075 Total (0.025 + 0.05) | 308 | 2.5 | +¼ | 3460 | 4910 |
| Cement No. 2 | | | | | | | |
| 142 | None | | 319 | 2.1 | 0 | 3210 | 4485 |
| 143 | Water Extract of Whole, Raw Carob | 0.01 | 314 | 2.5 | 0 | 3110 | 4460 |
| 144 | " | 0.025 | 315 | 2.5 | −¼ | 3245 | 4545 |
| 145 | " | 0.05 | 313 | 2.4 | +¼ | 3430 | 4865 |
| 146 | " | 0.1 | 312 | 2.7 | +1½ | 3620 | 5040 |
| 147 | Glucosaccharide | 0.05 | 313 | 2.3 | 0 | 3325 | 4510 |
| 148 | Calcium lignosulfonate | 0.25 | 292 | 4.3 | +½ | 3740 | 5080 |
| 149 | Triethanolamine plus Water Extract of Whole, Raw Carob | 0.050 Total (0.025 + 0.025) | 311 | 2.8 | −¼ | 3465 | 4760 |
| 150 | Triethanolamine plus Water Extract of Whole, Raw Carob | 0.075 Total (0.025 + 0.05) | 309 | 2.9 | −¼ | 3590 | 4880 |

[1] Acceleration of set is indicated by a minus (−) sign, while retardation of set is indicated by a plus (+) sign.

The water extract of the whole carob fruit was then employed in two Type I Portland cement mixes to form concretes. The cements were the same as those employed in the tests represented by the results in Tables I and II. The amount of cement in the mixes was nominally 5 sacks per cubic yard of concrete, the fine aggregate to coarse aggregate ratio was 0.48, and the consistencies of the concretes were such that they had slumps in the range of 3¼ to 3¾ inches.

As can be seen from the results set forth in Table IV, the use of carob fruit as an admixture in concrete produced beneficial increases in the compressive strengths of the hardened concrete mixes, as well as beneficial retardation of the rate of hardening of the mixes, as compared to plain concrete mixes. Further, the use of carob fruit produced comparable results to the known glucosaccharide and calcium lignosulfonate admixtures.

sive strength of the hardened cement mix. The fact that carob produced a retardation in the rate of hardening of the high alumina cement mixes involved means that carob fruit also would be useful as a retarder per se in high alumina cements, as well as in Portland type cements.

It is within the scope of the invention to incorporate, in the cement mixes prepared as herein provided, other additives known in the art for the express purpose for which they are normally employed. Such other additives may, for example, be air-entraining agents, air-detraining agents, pozzoulanic materials, fly ash, coloring agents, water repellents, set accelerators, and the like. Carob fruit may also be employed in conjunction with a combination of such cement additives to produce desired changes in the physical properties of the concrete being produced.

Table V

| Dose of Raw Carob Pod Additive; percent by weight of cement | Cement; lbs./cu. yd. of cement product | Water; lbs./cu. yd. of cement product | Air; vol. percent of cement product | Rate of hardening relative to plain mix;[1] hours | Compressive strength of cement product; p.s.i. 1 day | 7 days |
|---|---|---|---|---|---|---|
| None | 514 | 296 | 1.5 | 0 | 3500 | 4060 |
| 0.025 | 517 | 289 | 1.5 | +½ | 3890 | 4480 |
| 0.05 | 516 | 289 | 1.7 | +½ | 3980 | 4900 |

[1]Acceleration of set is indicated by a minus (−) sign, while retardation of set is indicated by a plus (+) sign.

It is also within the scope of the invention to employ the carob fruit together with known set retarders, such as lignosulfonates, sugars, glucosaccharides, and the like, or combinations thereof to obtain improvement in the compressive strength of the hardened mix. The carob fruit and said known set retarders can also be employed together with conventional set accelerators as mentioned above and as demonstrated by the results in Table IV to achieve a desired combination of benefits.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

What I claim is:

1. A hydraulic cement mix including hydraulic cement, aggregate, sufficient water to effect hydraulic setting of the cement, and an additive comprising pods, with or without the beans, of the carob tree, Ceratonia Siliqua, extracts of said pods, with or without beans, or combinations thereof, said additive being present in an amount of up to about 0.25% by weight based upon the weight of the cement to thereby increase the strength of the mix when hardened.

2. A hydraulic cement mix as claimed in claim 1 wherein said additive is present in an amount of between about 0.01% by weight and 0.1% by weight based upon the weight of the cement.

3. A hydraulic cement mix as claimed in claim 1 wherein said additive is present in an amount of between about 0.01% by weight and 0.05% by weight based upon the weight of the cement.

4. A hydraulic cement mix as claimed in claim 1 wherein said extracts are selected from the group consisting of aqueous extracts and are made by mixing an aqueous solvent, selected from the group consisting of water, acids and bases, and raw or roasted carob pods, with or without beans, or combinations thereof, and separating the insoluble residue from the aqueous extract.

5. A hydraulic cement mix as claimed in claim 1 wherein said hydraulic cement comprises Portland type cement.

6. A hydraulic cement mix as claimed in claim 1 wherein said aggregate comprises sand and said cement mix comprises a mortar mix.

7. A hydraulic cement mix as claimed in claim 1 wherein said aggregate comprises sand and crushed stone or gravel and said cement mix comprises a concrete mix.

8. A hydraulic cement mix as claimed in claim 1 wherein said hydraulic cement comprises a high alumina cement.

9. A process for increasing the strength of hydraulic cement mixes comprising incorporating in a hydraulic cement mix, including a hydraulic cement, aggregate and sufficient water to effect hydraulic setting of said cement, an additive comprising pods, with or without the beans, of the carob tree, Ceratonia Siliqua, extracts of said pods, with or without beans, or combinations thereof, and being present in an amount of up to about 0.25% by weight based upon the weight of the cement to thereby increase the strength of the mix when hardened.

10. A process as claimed in claim 9 wherein said additive is present in an amount of between about 0.01% by weight and 0.1% by weight based upon the weight of the cement.

11. A process as claimed in claim 9 wherein said additive is present in an amount of between 0.01% by weight and 0.05% by weight based upon the weight of the cement.

12. A process as claimed in claim 9 wherein said extracts are selected from the group consisting of aqueous extracts and are made by mixing an aqueous solvent, selected from the group consisting of water, acids and bases, and raw or roasted carob pods, with or without beans, or combinations thereof, and separating the insoluble residue from the aqueous extract.

13. A process as claimed in claim 9 wherein said hydraulic cement comprises Portland type cement.

14. A process as claimed in claim 9 wherein said aggregate comprises sand and said cement mix comprises a mortar mix.

15. A process as claimed in claim 9 wherein said aggregate comprises sand and crushed stone or gravel and said cement mix comprises a concrete mix.

16. A process as claimed in claim 9 wherein said hydraulic cement comprises a high alumina cement.

17. A hydraulic cement mix including hydraulic cement, aggregate in an amount within the range of 0% to about 80% by weight based upon the total weight of the dry cement and aggregate, and an additive comprising pods, with or without the beans, of the carob tree, Ceratonia Siliqua, extracts of said pods, with or without the beans, or combinations thereof, said additive being present in an amount of up to about 0.25% by weight based upon the weight of the cement to thereby increase the strength of the mix when hardened.

18. A hydraulic cement mix as claimed in claim 17 wherein said additive is present in an amount of between about 0.01% by weight and 0.1% by weight based upon the weight of the cement.

19. A hydraulic cement mix as claimed in claim 17 wherein said additive is present in an amount of between about 0.01% by weight and 0.05% by weight based upon the weight of the cement.

20. A hydraulic cement mix as claimed in claim 31 wherein said extracts are selected from the group consisting of aqueous extracts and are made by mixing an aqueous solvent, selected from the group consisting of water, acids and bases, and raw or roasted carob pods, with or without beans, or combinations thereof, and separating the insoluble residue from the aqueous extract.

21. A hydraulic cement mix as claimed in claim 17 wherein said hydraulic cement comprises Portland type cement.

22. A hydraulic cement mix as claimed in claim 17 wherein said hydraulic cement comprises a high alumina cement.

23. A hydraulic cement mix as claimed in claim 17 wherein there is further included sufficient water to effect hydraulic setting of the cement.

* * * * *

UNITED STATES PATENT AND TRADEMARK OFFICE
CERTIFICATE OF CORRECTION

PATENT NO. : 4,058,407          Page 1 of 3
DATED : November 15, 1977
INVENTOR(S) : James Allen Ray It is certified that error appears in the above-identified patent and that said Letters Patent are hereby corrected as shown below:

In Column 7, Before Line 20, --The results shown in Table No. I illustrate the use of carob fruit in the form of carob flour in Type I Portland cement mixes to form concretes. The carob flour was a commercially available, off-the-shelf product and comprised powder of the ground meal of the-- should be inserted.

In Columns 7 & 8, Table I, Mix No. 8, Air (column 5), "1.9" should be --2.1--

In Columns 9 & 10, Table II-continued, Mix No. 54, Percent by weight of cement (column 3), "0.1" should be --0.01--

In Columns 9 & 10, Table II-continued, Mix No. 77, Rate of hardening (column 6), "6 3 5/8" should be --+3 5/8--

In Columns 9 & 10, Table II-continued, Mix No. 82, Water (column 4), "1½1.8" should be --319--

In Columns 9 & 10, Table II-continued, Mix No. 82, Air (column 5), "+½" should be --1.8--

In Columns 9 & 10, Table II-continued, Mix No. 82, Rate of hardening (column 6), "3235" should be --+½--

In Columns 9 & 10, Table II-continued, Mix No. 82, Compressive strength - 7 days (column 7), --3235-- should be inserted.

In Columns 9 & 10, Table II-continued, Mix No. 84, Rate of hardening (column 6), "1.9" should be --0--

In Columns 9 & 10, Table II-continued, Mix No. 86, Additive (column 2), "1½" (ditto)" should be --"(ditto)--

UNITED STATES PATENT AND TRADEMARK OFFICE
CERTIFICATE OF CORRECTION

PATENT NO. : 4,058,407
DATED : November 15, 1977
INVENTOR(S) : James Allen Ray

It is certified that error appears in the above-identified patent and that said Letters Patent are hereby corrected as shown below:

In Columns 9 & 10, Table II-continued, Mix No. 86, Rate of hardening (column 6), "+311" should be --+1/2--

In Columns 9 & 10, Table II-continued, Mix No. 86, Compressive strength - 7 days (column 7), --3460-- should be inserted In Columns 9 & 10, Table II-continued, Mix No. 86, Compressive strength - 28 days (column 8), "3460" should be --4940--

In Columns 9 & 10, Table II-continued, Mix No. 87, Rate of hardening (column 6), "+103" should be --+2¼--

In Columns 9 & 10, Table II-continued, Mix No. 87, Compressive strength - 7 day (column 7), --3725-- should be inserted In Columns 9 & 10, Table II-continued, Mix No. 87, Compressive strength - 28 day (column 8), "3725" should be --5160--

In Columns 9 & 10, Table II-continued, Mix No. 116, Additive (column 2), "0.05" should be --Sodium Hydroxide Extract of Roast Carob[5]--

In Columns 9 & 10, Table II-continued, Mix No. 116, Percent by weight (column 3), "315" should be --0.05--

In Columns 9 & 10, Table II-continued, Mix No. 116, Water (column 4), "2.0" should be --315--

In Columns 9 & 10, Table II-continued, Mix No. 116, Air (column 5), "+7/8" should be --2.0--

UNITED STATES PATENT AND TRADEMARK OFFICE
CERTIFICATE OF CORRECTION

PATENT NO. : 4,058,407
DATED : November 15, 1977
INVENTOR(S) : James Allen Ray

It is certified that error appears in the above-identified patent and that said Letters Patent are hereby corrected as shown below:

In Columns 9 & 10, Table II-continued, Mix No. 116, Rate of hardening (column 6), "3040" should be --+7/8--

In Columns 9 & 10, Table II-continued, Mix No. 116, Compressive strength - 7 day (column 6), "4685" should be --3040--

In Columns 9 & 10, Table II-continued, Mix No. 116, Compressive strength - 28 day (column 7), --4685-- should be inserted In Columns 11 & 12, Table II-continued, Mix No. 118, Rate of hardening (column 6), "+1 1/8" should be --+1/8--

In Columns 11 & 12, Table II-continued, Mix No. 131, Rate of hardening (column 6), "+1/8" should be --+1 1/8--

In Column 11, Line 49, "into" should be --inch to--

In Column 11, Line 61, "15 psig" should be --14 psig--

In Column 11, Line 66, "cooker pot" should be --cooker cooking pot--

Signed and Sealed this

Second Day of May 1978

[SEAL]

Attest:

RUTH C. MASON
Attesting Officer

LUTRELLE F. PARKER
Acting Commissioner of Patents and Trademarks